United States Patent
Thomas et al.

(10) Patent No.: US 9,912,393 B2
(45) Date of Patent: Mar. 6, 2018

(54) RADIO FREQUENCY BEAMFORMING BASIS FUNCTION FEEDBACK

(71) Applicant: Nokia Solutions and Networks Oy, Espoo (FI)

(72) Inventors: Timothy Thomas, Au Train, MI (US); Frederick Vook, Schaumburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/128,691

(22) PCT Filed: Mar. 26, 2014

(86) PCT No.: PCT/US2014/031870
§ 371 (c)(1),
(2) Date: Sep. 23, 2016

(87) PCT Pub. No.: WO2015/147814
PCT Pub. Date: Oct. 1, 2015

(65) Prior Publication Data
US 2017/0222703 A1    Aug. 3, 2017

(51) Int. Cl.
*H04B 7/02*         (2017.01)
*H04B 7/06*         (2006.01)
(Continued)

(52) U.S. Cl.
CPC ........... *H04B 7/0617* (2013.01); *H04B 7/063* (2013.01); *H04B 17/24* (2015.01); *H04L 5/0048* (2013.01);
(Continued)

(58) Field of Classification Search
CPC ................ H04B 1/0483; H04B 1/0475; H04B 2001/045; H04B 7/0456; H04B 7/0695;
(Continued)

(56) References Cited

U.S. PATENT DOCUMENTS 6,141,393 A    10/2000 Thomas et al.
7,676,007 B1*  3/2010 Choi .................... H04B 7/0617
                                                        375/267
(Continued)

OTHER PUBLICATIONS

International Search Report and Written Opinion received for corresponding Patent Cooperation Treaty Application No. PCT/US2014/031870, dated Aug. 22, 2014, 11 pages.

*Primary Examiner* — Khanh C Tran
(74) *Attorney, Agent, or Firm* — Squire Patton Boggs (US) LLP

(57) ABSTRACT

Methods, apparatuses, systems, and computer program products for obtaining full channel knowledge between each transmitter and each receiver when using radio frequency (RF) beamforming are provided. One method described herein includes a method of obtaining channel knowledge at a transmitter with Q transmit antennas for use in beamforming where the transmitter transmits sounding waveforms from B orthogonal basis functions from a transmit array comprised of the Q transmit antennas. In response to the transmitted sounding waveforms the transmitter receives at least one feedback message from a receiver. The feedback message(s) may include an indication of the best $M_B$ basis functions plus a gain and phase value for each of the $M_B$ basis functions.

20 Claims, 8 Drawing Sheets

(51) Int. Cl.
*H04B 17/24* (2015.01)
*H04L 5/00* (2006.01)
*H04L 27/26* (2006.01)
*H04B 7/0452* (2017.01)

(52) U.S. Cl.
CPC ........ *H04L 27/2636* (2013.01); *H04B 7/0452* (2013.01)

(58) Field of Classification Search
CPC ........ H04B 2201/70701; H04B 7/0417; H04B 7/0452; H04B 7/0619; H04B 7/068; H04B 7/0697; H04B 7/088; H04L 27/20; H04L 27/36; H04L 27/366; H04L 5/0007; H04L 5/0048; H04L 27/265; H04L 2025/03426; H04L 23/02; H04L 25/0202; H04L 27/22; H04L 27/2646; H04W 36/30; H04J 13/18
See application file for complete search history.

(56) References Cited

U.S. PATENT DOCUMENTS

| | | | |
|---|---|---|---|
| 2007/0121741 A1 | 5/2007 | Tang et al. | |
| 2012/0122407 A1 | 5/2012 | Allpress et al. | |
| 2013/0083666 A1* | 4/2013 | Gaal | H04L 5/0053 370/241 |
| 2013/0258873 A1 | 10/2013 | Stauffer et al. | |
| 2014/0341048 A1* | 11/2014 | Sajadieh | H04L 5/0085 370/252 |
| 2015/0270884 A1* | 9/2015 | Tomeba | H04B 7/0417 370/329 |

* cited by examiner

RADIO FREQUENCY BEAMFORMING BASIS FUNCTION FEEDBACK

RELATED APPLICATION

This application was originally filed as Patent Cooperation Treaty Application No. PCT/US2014/031870 filed Mar. 26, 2014

BACKGROUND

Field

Certain embodiments may generally relate to beam scanning at a millimeter wave (mmWave) beamforming transmitter. For example, some embodiments may provide a solution on how to obtain the full channel knowledge for radio frequency (RF) beamforming at a mmWave beamforming transmitter.

Description of the Related Art

A global bandwidth shortage facing wireless carriers has motivated the consideration of the underutilized millimeter wave (mmWave) frequency spectrum for future broadband cellular communication networks. mmWave (or extremely high frequency) generally refers to the frequency range between 30 and 300 gigahertz (GHz). This is the highest radio frequency band in practical use today. Radio waves in this band have wavelengths from ten to one millimeter, giving it the name millimeter band or millimeter wave.

The amount of wireless data might increase one thousand fold over the next ten years. Essential elements in solving this challenge include obtaining more spectrum, having smaller cell sizes, and using improved technologies enabling more bits/s/Hz. An important element in obtaining more spectrum is to move to higher frequencies, above 6 GHz. For fifth generation wireless systems (5G), an access architecture for deployment of cellular radio equipment employing mmWave radio spectrum has been proposed. In addition to extending cellular service into the mmWave band, dynamic spectrum access is an important technique to improve spectrum utilization.

SUMMARY

One embodiment is directed to a method of obtaining channel knowledge at a transmitter with Q transmit antennas for use in beamforming. The method may include transmitting, by a transmitting device, sounding waveforms from B orthogonal basis functions from a transmit array comprised of the Q transmit antennas of the transmitting device. The method may also include receiving at least one feedback message from a receiver, wherein the at least one feedback message comprises an indication of the best $M_B$ basis functions and a gain and phase value for each of the $M_B$ basis functions.

Another embodiment is directed to an apparatus including at least one processor and at least one memory including computer program code. The at least one memory and the computer program code may be configured, with the at least one processor, to cause the apparatus at least to transmit sounding waveforms from B orthogonal basis functions from a transmit array comprised of Q transmit antennas of the apparatus, and to receive at least one feedback message from a receiver, wherein the at least one feedback message comprises an indication of the best $M_B$ basis functions and a gain and phase value for each of the $M_B$ basis functions.

Another embodiment may be directed to a computer program embodied on a computer readable medium. The computer program may be configured to control a processor to perform a method, which may include transmitting, by a transmitting device, sounding waveforms from B orthogonal basis functions from a transmit array comprised of the Q transmit antennas of the transmitting device. The method may also include receiving at least one feedback message from a receiver, wherein the at least one feedback message comprises an indication of the best $M_B$ basis functions and a gain and phase value for each of the $M_B$ basis functions.

Another embodiment is directed to a method of determining channel feedback. The method may include receiving, by a receiving device, sounding waveforms from a transmitter, where each of the sounding waveforms comprises a waveform sent from B orthogonal basis functions where the orthogonal basis functions comprise B Qx1 orthogonal transmit beams. The method may further include determining the $M_B$ best basis functions, determining a gain and phase for each of the $M_B$ basis functions, creating a feedback message comprising an indication of the $M_B$ best basis functions along with the corresponding gain and phase for the $M_B$ best basis functions, and transmitting the feedback message to the transmitter.

Another embodiment is directed to an apparatus including at least one processor and at least one memory including computer program code. The at least one memory and the computer program code may be configured, with the at least one processor, to cause the apparatus at least to receive sounding waveforms from a transmitter, where each of the sounding waveforms comprises a waveform sent from Q orthogonal basis functions, wherein the orthogonal basis functions comprise B Qx1 orthogonal transmit beams. The at least one memory and the computer program code may be further configured, with the at least one processor, to cause the apparatus at least to determine the $M_B$ best transmit basis functions, determine a gain and phase for each of the $M_B$ basis functions, create a feedback message comprising an indication of the $M_B$ best basis functions along with the corresponding gain and phase for the $M_B$ best basis functions, and transmit the feedback message to the transmitter.

Another embodiment may be directed to a computer program embodied on a computer readable medium. The computer program may be configured to control a processor to perform a method, which may include receiving, by a receiving device, sounding waveforms from a transmitter, where each of the sounding waveforms comprises a waveform sent from B orthogonal basis functions where the orthogonal basis functions comprise B Qx1 orthogonal transmit beams. The method may further include determining the $M_B$ best basis functions, determining a gain and phase for each of the $M_B$ basis functions, creating a feedback message comprising an indication of the $M_B$ best basis functions along with the corresponding gain and phase for the $M_B$ best basis functions, and transmitting the feedback message to the transmitter.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for obtaining the full channel knowledge between each transmit (Tx) antenna and each receiver (Rx) antenna when using RF beamforming at either the Tx or Rx or both, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

One problem that is addressed by certain embodiments is how to obtain the full channel knowledge at a radio frequency (RF) millimeter (mmWave) beamforming transmitter. The difficulty with employing baseband array processing at mmWave is that the analog to digital (A-D) converters and digital to analog (D-A) converters consume an unacceptable amount of power because of the large bandwidths of mmWave systems (e.g., bandwidths of 1-2 GHz as opposed to 20 MHz for traditional cellular frequencies).

Figure 1:
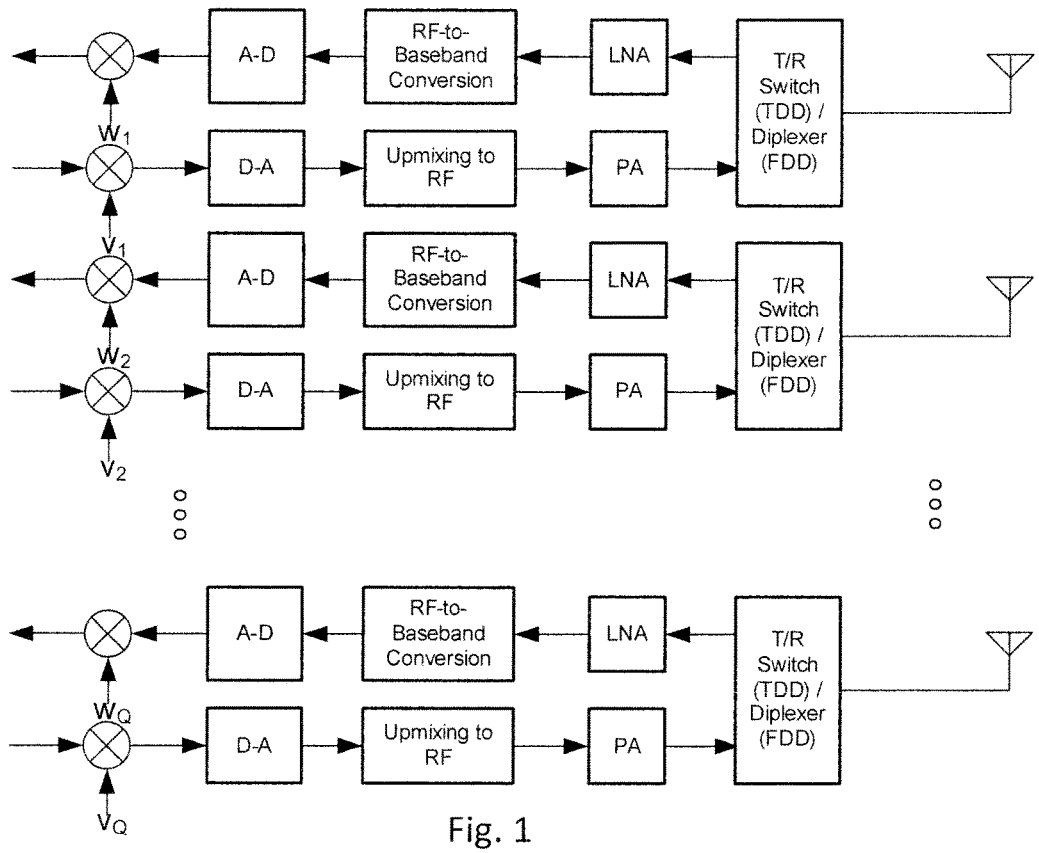
FIG. 1 illustrates an example block diagram of baseband array processing.

The large power consumption of the D-A and A-D converters means that the number of A-D and D-A converters needs to be minimized in mmWave and, as a result, traditional array processing at baseband is no longer viable. FIG. 1 illustrates an example of traditional baseband array processing (Q baseband units for Q total antennas). Wideband beamforming is illustrated in FIG. 1, but the beamforming can also be frequency selective by applying per-subcarrier weights in the frequency domain. The traditional baseband processing means that there is a full transceiver (Tx/Rx chain) behind each antenna. The baseband beamforming can be wideband as shown (i.e., with a single transmit weight, $V_1$ through $V_Q$, and a single receive weight, $W_1$ through $W_Q$) or with frequency-selective weights applied at baseband in the frequency domain. At traditional cellular frequencies, the number of antennas/baseband transceivers is typically less than or equal to 8, but at mmWave a larger number of antennas is needed (e.g., greater than or equal to 16) to overcome the increased path loss at the higher frequencies.

Figure 2:
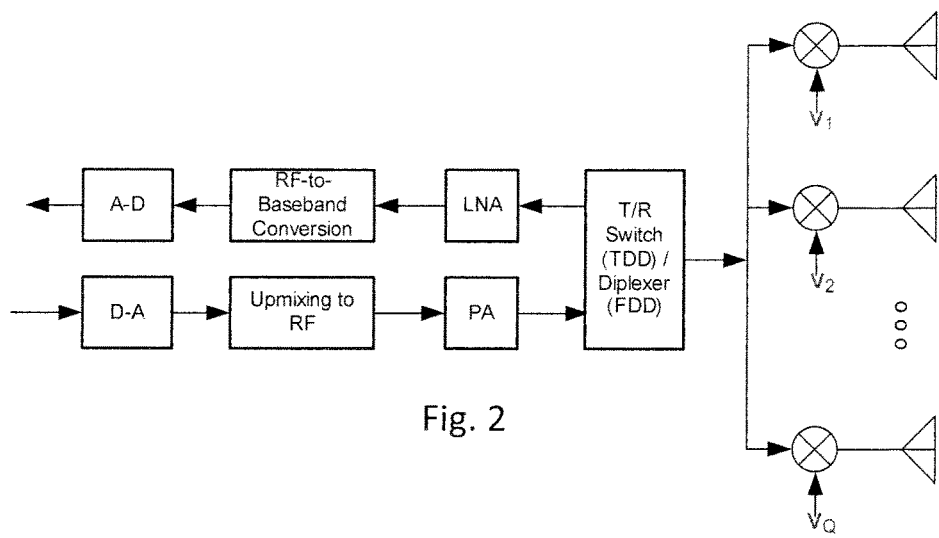
FIG. 2 illustrates an example block diagram of RF beamforming with a single RF beamformer and a single baseband path.
Figure 3:
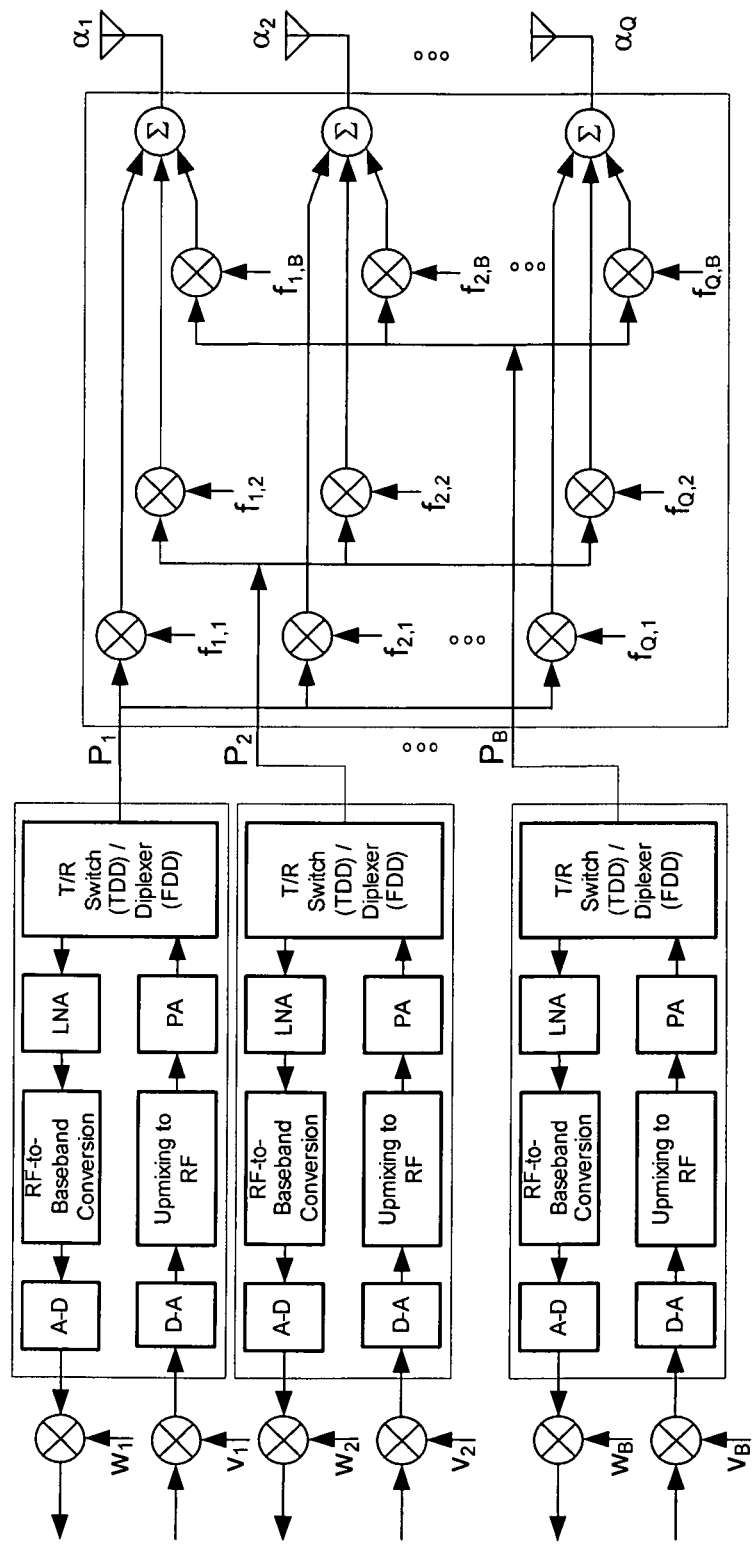
FIG. 3 illustrates an example block diagram of RF beamforming with B RF beamformers and B baseband paths serving Q antennas.

However, as mentioned above, it is not practical to put a full baseband transceiver behind each antenna, so instead a single or a small number of baseband paths are available for beamforming to an RF beamforming array as illustrated in FIG. 2 (for a single baseband path for all Q elements) and FIG. 3 (for B baseband paths behind all Q elements where B<<Q). In particular, FIG. 2 illustrates RF beamforming with a single RF beamformer and a single baseband path (one baseband unit for Q total antennas); while FIG. 3 illustrates RF beamforming with B RF beamformers and B baseband paths serving Q antennas (Q>>B).

The goal of channel estimation is to get the gain and phase of the channel between each transmit (Tx) antenna element and each receive (Rx) antenna element. With a separate baseband path behind each element as shown in FIG. 1, the full channel between a transmitter and a receiver can be obtained. This problem is solved in traditional cellular systems, such as long term evolution (LTE), by sending pilots from each Tx antenna separately, receiving them all at the same time on each Rx antenna, and then using a channel estimator to get the full channel. Complicating matters at mmWave is that the receiver will be receiving any pilot transmission from the transmitter with a RF receiver beamformer. The result is that even if a single transmit antenna is sounded, the received signal will not be to a single receive antenna but an aggregated signal from multiple receive antennas. The approach of sounding each Tx antenna separately and listening on each Rx antenna separately is not practical since there will be no beamforming gain to overcome the path loss so a very long sounding period would be needed to overcome the path loss (i.e., the use of very long spreading codes).

Therefore, embodiments of the invention provide a means of obtaining the full channel knowledge when using Tx and Rx RF beamforming. More specifically, some embodiments provide a means of obtaining the full channel knowledge between each Tx antenna and each Rx antenna when using RF beamforming at either the Tx or Rx or both.

Some of the Tx and Rx configurations considered are illustrated in FIG. 2 and FIG. 3 discussed above, but the following description will concentrate on the Tx and Rx having the configuration shown in FIG. 2 with a single Tx and Rx RF weight vector. It will be assumed that the Tx array is an M×M array ($M^2$ total antennas) and the Rx array is an N×N array ($N^2$ total antennas) where both arrays have uniform spacing of antennas in each dimension (e.g., 0.5 wavelength spacing). However, embodiments are not limited to this configuration and this concept can easily be applied to one-dimensional arrays, rectangular arrays of size $M_h \times M_v$ for the Tx and $N_h \times N_v$ for the Rx, circular arrays, and any other arbitrary array.

One embodiment may include sending sounding waveforms using $Q=M^2$ orthogonal transmit basis functions (where a basis function can be viewed as a transmit weight vector or transmit beam), and then the receiver sending feedback for the dominant $M_B$ basis functions. The feedback may then be used to determine the actual channel between each transmit antenna and the best beam at the receiver as described below. Note, however, in general that $B_f$ transmit basis functions can be used instead of $Q=M^2$ transmit basis functions. For example, if no Rx will be located at certain azimuth and/or elevation angles relative to the Tx array, then $B_f < Q$ basis functions may be used which will reduce system overhead by reducing the number of basis functions which need to be sounded.

For a two dimensional array with M antennas in each dimension, basis functions may first be chosen for each dimension (i.e., azimuth or elevation), and then the set of overall basis functions may be formed as the Kronecker combination of the basis functions for the azimuth and elevation dimensions. For example, the basis functions in one dimension (i.e., azimuth or elevation) can be chosen from a sampling of the DFT matrix V whose $(n,m)^{th}$ element is given by:

$$V_{nm}(M) = \exp\left\{-j\frac{2\pi}{M}(n-1)(m-1)\right\},$$

where $1 \le n \le M$ and $1 \le m \le M$ Referring again to FIG. 2 (with Q in the figure equal to $M^2$), the transmit weights ($v_1$ through $v_Q$) for one of the basis functions would then be the Kronecker product of two of the columns of V (one column for elevation and one column for azimuth). In equation form let $z_n$ refer to column n of V:

$$z_n = \begin{bmatrix} V_{1n} \\ \vdots \\ V_{Mn} \end{bmatrix},$$

then the set of $M^2$ basis functions or transmit weight vectors (where each weight vector is $M^2 \times 1$) may be defined by ($1 \le n \le M$ and $1 \le m \le M$):

$$v_{n+M(m-1)} = \begin{bmatrix} V_{1m} z_n \\ V_{2m} z_n \\ \vdots \\ V_{Mm} z_n \end{bmatrix}.$$

The above equation is what is meant by Kronecker product of two of the columns of V. Note that these basis functions can be referred to as having a DFT matrix structure since they are generated from the columns of V. More particularly, since these basis functions are the Kronecker product of columns of V, they can be referred to as having a 2D DFT matrix structure. Also these basis functions can be thought of as Qx1 transmit beams derived from a discrete Fourier transform (DFT) matrix. If all M columns of V are used as described above then the basis functions created will be orthogonal. However, not all columns may be used in some embodiments. For example, the range of elevation or azimuth angles that an array needs to operate over may be limited. In this case, not all M columns of V may be used to create the basis functions in one or both of the dimensions (azimuth or elevation).

It should be noted that to be able to steer the beams as designed, for example with the DFT matrix structure given above, for each Tx weight vector in this set, the transmitter may transmit a reference signal over the resulting beam. Assuming the receiver already chose its best Rx beam, the receiver may then determine the best $M_B$ Tx beams to send feedback for (e.g., choose the $M_B$ ones received with the highest power). For each of those $M_B$ Tx beams the receiver may determine a gain and phase value from the sounding waveform for that Tx beam. The Rx may then feed back an indication of the $M_B$ best Tx beams along with their corresponding gain and phase values. The gain and phase can be quantized in some standard fashion (e.g., uniform sampling of the phase and uniform sampling of the gain between zero and one where the gain is normalized to the strongest beam). The Tx can determine the $M^2 \times 1$ channel from its transmit antennas to the Rx beam used from the feedback as follows:

$$h = \sum_{\ell=1}^{M_B} \alpha_\ell v_{f_\ell},$$

where $\alpha_n$ is the gain and phase of the $n^{th}$ fed-back beam and $f_n$ is the index of the $n^{th}$ fed-back beam.

Figure 4:
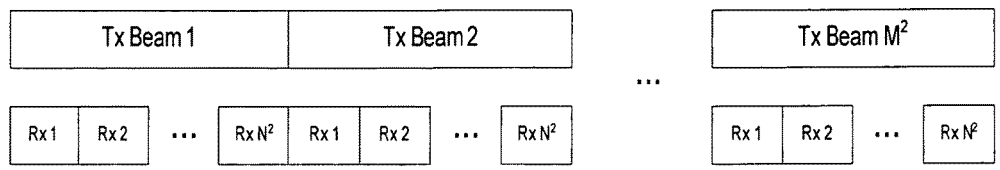
FIG. 4 illustrates an example block diagram of a basis function sounding methodology, according to an embodiment.
Figure 5:
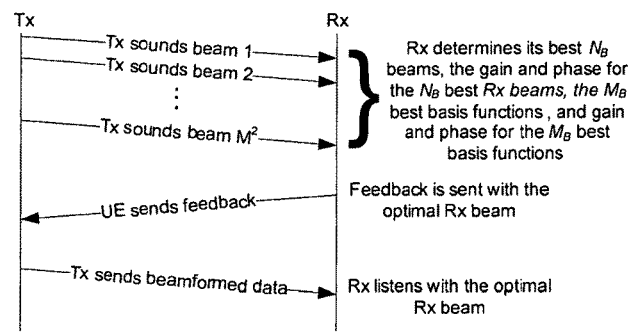
FIG. 5 illustrates a signaling flow diagram, according to an embodiment.

FIG. 4 illustrates an example method of sounding all basis functions, according to an embodiment. FIG. 5 illustrates an example signalling flow between the Tx and Rx, according to one embodiment. For each transmit orthogonal basis function beam, the receiver may loop through all of its receive orthogonal basis function beams to determine which is the best receive weight as a weighted sum of the receive weights. Once the receiver determines its receive weight it may determine the $M_B$ strongest Tx beams and then may compute the gain and phase of each of the $M_B$ strongest Tx beams. Then the receiver may send feedback to the transmitter where the feedback may include indices of the $M_B$ strongest Tx beams plus their corresponding gain and phase values. Note that $M_B$ may be predetermined (e.g., $M_B=8$) or may be chosen at each feedback interval by the receiver (e.g., the $M_B$ Tx beams which have a power within some threshold of the strongest beam).

To determine the best receive weight the user could listen on each of its $N^2$ receive orthogonal basis function beams to the signal transmitted by the best $M_B$ Tx beams or simply just the best (i.e., strongest) Tx beam. Then the receiver can determine its strongest $N_B$ beams, $w_1$ through $w_{NB}$, along with a respective gain and phase for each of those beams, $\beta_1$ through $\beta_{NB}$. Note that the receive beams can be determined similarly to the transmit beams, v, above with M in the equation replaced by N. Then the actual receive weight would be given by:

$$u = \sum_{\ell=1}^{N_B} \beta_\ell w_{g_\ell}$$

where $g_n$ is the index of the $n^{th}$ receive beam.

In another embodiment, to reduce feedback, the M×M Tx array can be broken up into azimuth and elevation dimensions and then basis functions are sounded in each dimension separately requiring only 2M total sounding waveforms to be sent. A similar procedure can be done for the N×N Rx array.

In yet another embodiment, to obtain the full $M^2 \times N^2$ channel (instead of a $M^2 \times 1$ channel to a single Rx beam), the Rx can feedback an indication of its best $N_B$ Rx beams along with the respective gain and phase values. Then, the full M×N channel can be determined at the transmitter as a function of the feedback for the Tx and Rx arrays. Certain algorithms such as interference alignment would need the full $M^2 \times N^2$ channel and not just the best $M^2 \times 1$ transmit weight. For example, the Rx could feedback $N_B = M_B$ best Rx and Tx beam pairs along with a common gain and phase value for a pair of Tx and Rx beams ($M^2 \times 1$ $v_n$ and $N^2 \times 1$ $w_n$ respectively). Note that $w_n$ is defined similarly to $v_n$ above except with variable M replaced with variable N. The $n^{th}$ gain and phase value, $a_n$, for the Tx/Rx beam pair would be determined as the gain and phase received on beam $w_n$ when the Tx is transmitting with beam $v_n$. Then the full $M^2 \times N^2$ channel could be determined as:

$$H = \sum_{\ell=1}^{M_B} \alpha_\ell v_{f_\ell} w_{f_\ell}^T,$$

where $f_n$ is the index of the $n^{th}$ fed-back beam pair.

In another embodiment the feedback could be frequency selective enabling the Tx to determine the channel as it changes across frequency. For each different part of the frequency band, say k=1, . . . , K, which corresponds to different discrete tones in the frequency domain, the best $M_B$ Tx beams, $v_1(k)$ through $v_{MB}(k)$, or the best $M_B$ Tx/Rx beam pairs, $\{v_1(k), w_1(k)\}$ through $\{v_{MB}(k)$ through $w_{MB}(k)\}$ are determined along with a respective gain and phase value $\alpha_1(k)$ through $\alpha_{MB}(k)$. Then the channel on tone k can be determined as:

$$h(k) = \sum_{\ell=1}^{M_B} \alpha_\ell(k) v_{f_\ell(k)}(k)$$

for just Tx beam feedback or the matrix channel can be determined as $$H(k) = \sum_{\ell=1}^{M_B} \alpha_\ell(k) v_{f_\ell(k)}(k) w_{f_\ell(k)}^T(k)$$

for Tx/Rx beam pair feedback, where and $f_n(k)$ is the index of the $n^{th}$ fed-back beam/beam pair on subcarrier/tone k. Note that $M_B$ could be the same on each tone, k, or different $M_B$ values could be used and fed back on each tone.

In another embodiment, the time-domain channel at different taps is determined at the Rx and is fed back to the Tx. For example, the Rx could first determine the $N_T$ dominant time of arrivals it sees, $t_1$, through $t_{NT}$. Next, for each time of arrival, the best $M_B$ Tx beams, $v_1(t)$ through $v_{MB}(t)$, or the best $M_B$ Tx/Rx beam pairs, $\{v_1(t), w_1(t)\}$ through $\{v_{MB}(t)$ through $w_{MB}(t)\}$ are determined along with a respective gain and phase value $\alpha_1(t)$ through $\alpha_{MB}(t)$ for $t=\{t_1, t_2, \ldots, t_{NT}\}$. Note that $M_B$ could be the same for each time of arrival or different $M_B$ values could be used and fed back for each time of arrival. Then the channel for time of arrival t can be determined as:

$$h(t) = \sum_{\ell=1}^{M_B} \alpha_\ell(t) v_{f_\ell(t)}(t)$$

for just Tx beam feedback or the matrix channel can be determined as $$H(t) = \sum_{\ell=1}^{M_B} \alpha_\ell(t) v_{f_\ell(t)}(t) w_{f_\ell(t)}^T(t)$$

for Tx/Rx beam pair feedback, where and $f_n(t)$ is the index of the $n^{th}$ fed-back beam for time of arrival t.

Simulation results are presented in FIGS. 6 and 7 comparing the basis function method to ideal channel knowledge and a fine grid of beams. Two cases are considered. The first case is for a single-user system as in FIG. 2 with only a single beam to be aligned. The second case is a four user multiple user multiple input multiple output (MU-MIMO) system using the array of FIG. 3 with B=4. In all cases the Tx array is a 4×4 RF array and the Rx array is a 2×2 RF array. In these simulations, only the alignment at the Tx was considered and it was assumed that the Rx weights were already aligned. Two channel types are considered, a single ray line of sight (LOS) additive white Gaussian noise (AWGN) channel and a mmWave test channel derived from: M. Kyrö, et. al., "Experimental Propagation Channel Characterization of mm-Wave Radio Links in Urban Scenarios," *IEEE Antennas and Wireless Propagation Letters*, Vol. 11, 2012. For the basis function feedback, only the best $M_B=8$ beams are fed back to the Tx. In all cases, the signal-to-noise ratio (SNR) before beamforming was 0 dB and the feedback was computed and sent back error free.

Figure 6A:
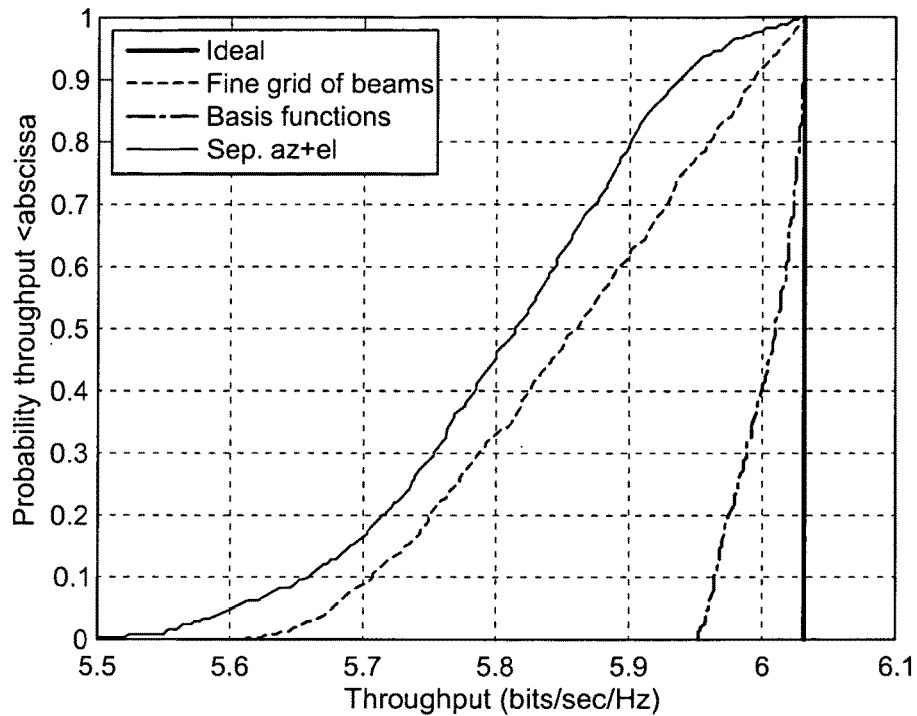
FIG. 6a illustrates an example of single-user throughput results for an AWGN LOS channel.
Figure 6B:
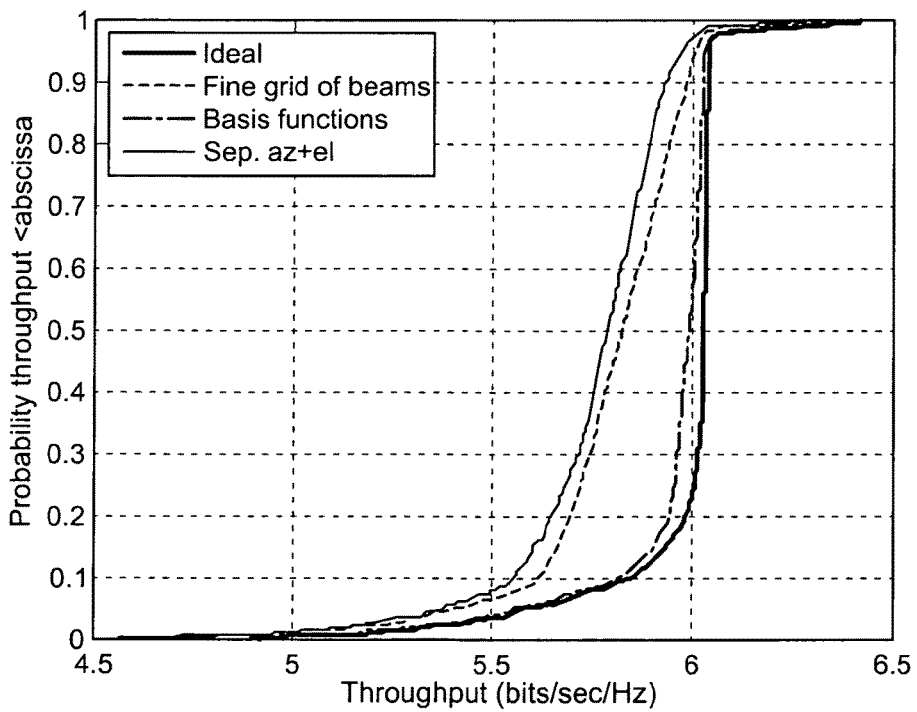
FIG. 6b illustrates an example of single-user throughput results for the simulated mmWave channel, according to an embodiment.
Figure 7A:
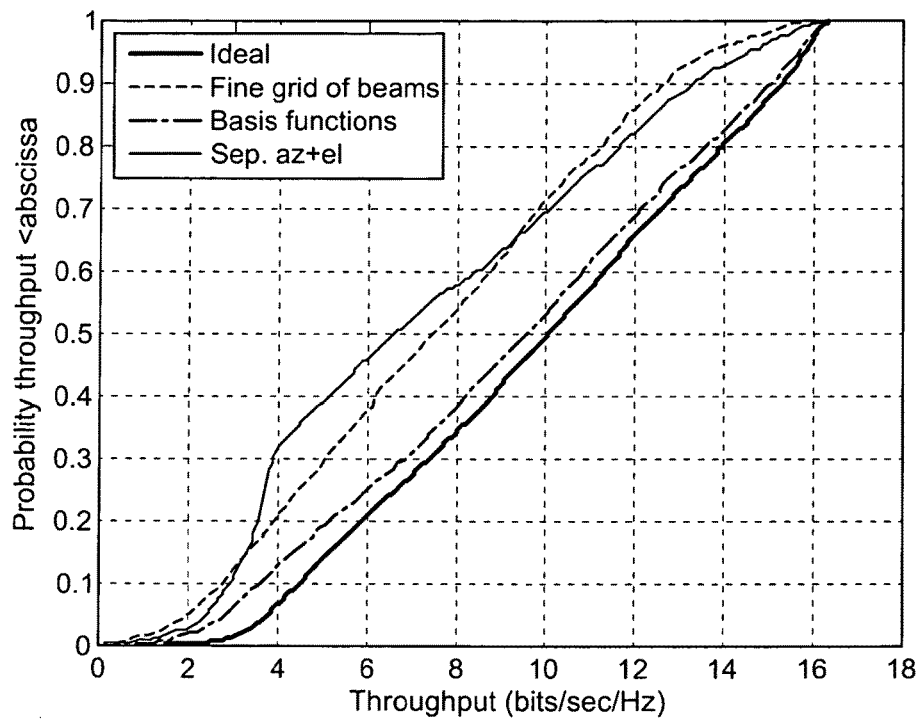
FIG. 7a illustrates an example of MU-MIMO sum throughput results for an AWGN LOS channel.
Figure 7B:
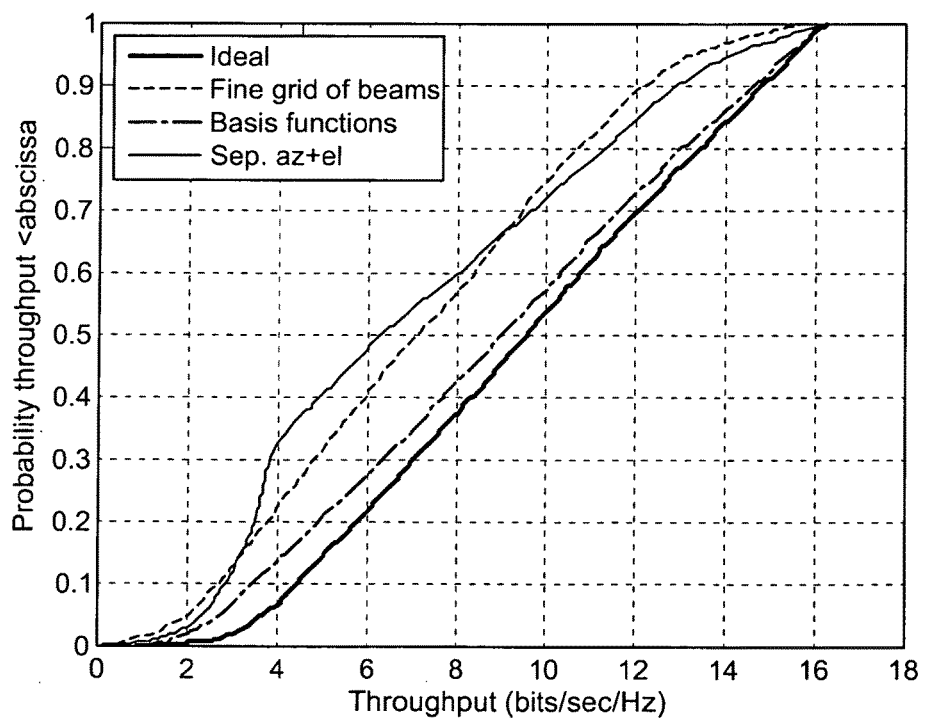
FIG. 7b illustrates an example of MU-MIMO sum throughput results for the simulated mmWave channel, according to an embodiment.

FIG. 6 illustrates a graph showing the single-user throughput results for an AWGN LOS channel. FIG. 7 illustrates a graph showing the MU-MIMO sum throughput results. In particular, FIG. 6a depicts single-user throughput results for an AWGN LOS channel, and FIG. 6b depicts single-user throughput results for the simulated mmWave channel. FIG. 7a depicts MU-MIMO sum throughput results for an AWGN LOS channel, and FIG. 7b depicts MU-MIMO sum throughput results for the simulated mmWave channel.

In the legend of FIGS. 6 and 7, "Sep. az+el" refers to sounding the azimuth and elevation dimensions separately for the grid of beams approach (not the alternate embodiment of the invention). The ideal weights are the ideal frequency-flat transmit weights computed from ideal channel knowledge. In both cases, embodiments of the invention (basis functions) achieve performance very close to ideal and have a substantial gain over the other methods especially in the MU-MIMO case.

Figure 8A:
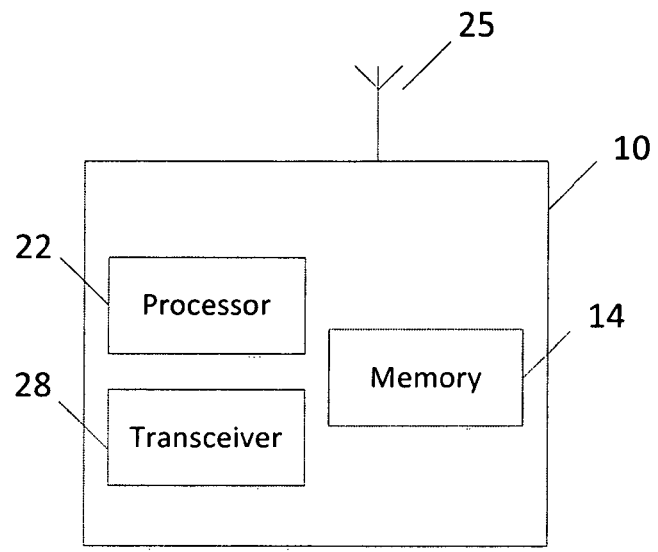
FIG. 8a illustrates a block diagram of an apparatus, according to one embodiment.

FIG. 8a illustrates an example of an apparatus 10 according to an embodiment. In an embodiment, apparatus 10 may be a node, host, or server in a communications network or serving such a network. It should be noted that one of ordinary skill in the art would understand that apparatus 10 may include components or features not shown in FIG. 8a.

As illustrated in FIG. 8a, apparatus 10 may include a processor 22 for processing information and executing instructions or operations. Processor 22 may be any type of general or specific purpose processor. While a single processor 22 is shown in FIG. 8a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further comprise or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also comprise or be coupled to one or more antennas 25 for transmitting and receiving signals and/or data to and from apparatus 10. Apparatus 10 may further comprise or be coupled to a transceiver 28 configured to transmit and receive information. The transceiver may be an external device, such as a remote radio head. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a server, node or host or base station in a communications network or serving such a network. In one embodiment, apparatus 10 may be controlled by memory 14 and processor 22 to obtain channel knowledge at a transmitter of apparatus 10 with Q transmit antennas for use in beamforming where the transmitter transmits sounding waveforms from Q orthogonal basis functions from its transmit array. In response to the transmitted sounding waveforms, apparatus 10 may be controlled to receive feedback message from a receiver. In an embodiment, the feedback information may include an indication of the best $M_B$ transmit beams plus a gain and phase value for each of the $M_B$ beams.

In some embodiments, apparatus 10 may be controlled to obtain a channel estimate from the received feedback message. The feedback message may also include an indication of the best $N_B$ receive beams plus a gain and phase value for each of the $N_B$ receive beam. In one embodiment, the feedback message may also include the number of best beams. According to an embodiment, the Q orthogonal basis functions may be derived from a DFT matrix.

Figure 8B:
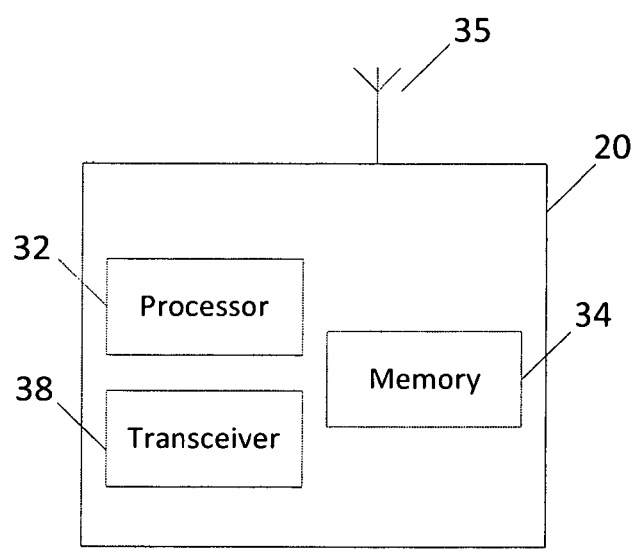
FIG. 8b illustrates a block diagram of an apparatus, according to another embodiment.

FIG. 8b illustrates an example of an apparatus 20 according to an embodiment. In an embodiment, apparatus 20 may be a node, host, server or base station in a communications network or serving such a network. It should be noted that one of ordinary skill in the art would understand that apparatus 20 may include components or features not shown in FIG. 8b.

As illustrated in FIG. 8b, apparatus 20 may include a processor 32 for processing information and executing instructions or operations. Processor 32 may be any type of general or specific purpose processor. While a single processor 32 is shown in FIG. 8b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further comprise or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also comprise or be coupled to one or more antennas 35 for transmitting and receiving signals and/or data to and from apparatus 20. Apparatus 20 may further comprise or be coupled to a transceiver 38 configured to transmit and receive information. The transceiver may be an external device, such as a remote radio head. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a server, node or host or base station in a communications network or serving such a network. In one embodiment, apparatus 20 may be controlled by memory 34 and processor 32 to receive sounding waveforms from a transmitter. Each sounding waveform may include a waveform sent from Q orthogonal basis functions. Apparatus 20 may be further controlled by memory 34 and processor 32 to determine the $M_B$ best transmit beams, determine a gain and phase for each of the $M_B$ beams, create a feedback message containing an indication of the $M_B$ best beams along with the corresponding gain and phase for the $M_B$ best beams, and transmit the feedback message to the transmitter.

According to an embodiment, apparatus 20 may be further controlled by memory 34 and processor 32 to determine its best receive beam from the transmit beam sounding waveforms and then determine the best transmit basis function feedback for the best receive beam. In one embodiment, the best receive beam may be determined by choosing the best $N_B$ receive beams, a gain and phase for each of the $N_B$ beams, and then determining the best receive beam as a function of the $N_B$ best receive beams and their respective gain and phase values. In one example, the feedback message may also contain an indication of the best $N_B$ receive beams along with their corresponding gain and phase values. According to one embodiment, apparatus 20 may be further controlled by memory 34 and processor 32 to transmit its feedback message using its best beam.

Figure 9A:
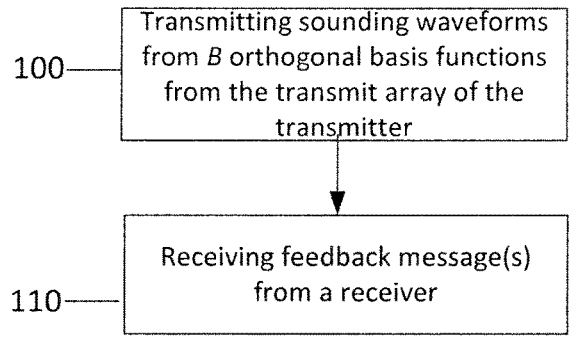
FIG. 9a illustrates a flow diagram of a method, according to one embodiment.

FIG. 9a illustrates an example flow diagram of a method for obtaining channel knowledge at a transmitting device. In an embodiment, the transmitter may have Q transmit antennas. In some embodiments, the channel knowledge may be obtained for use in beamforming. As illustrated in the example embodiment of FIG. 9a, the method may include, at 100, transmitting sounding waveforms from B orthogonal basis functions from the transmit array of the transmitter. In some embodiments, B may be equal to Q. The method may then include, at 110, in response to the transmitted sounding waveforms, receiving feedback message(s) from a receiver. According to an embodiment, the feedback message(s) may include an indication of the best $M_B$ transmit beams plus a gain and phase value for each of the $M_B$ beams.

Figure 9B:
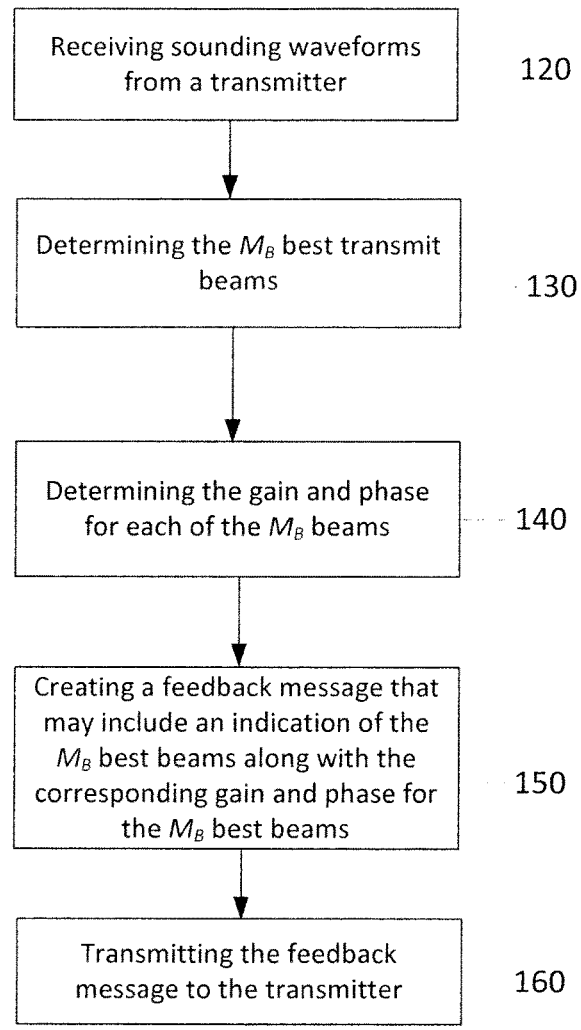
FIG. 9b illustrates a flow diagram of a method, according to another embodiment.

FIG. 9b illustrates an example flow diagram of a method for determining channel feedback at a receiving device. As illustrated in the example embodiment of FIG. 9b, the method may include, at 120, receiving sounding waveforms from a transmitter. In an embodiment, each of the sounding waveforms may include a waveform sent from Q orthogonal basis functions. The method may then include, at 130, determining the $M_B$ best transmit beams and, at 140, determining the gain and phase for each of the $M_B$ beams. In some embodiments, the method may further include, at 150, creating a feedback message that may include an indication of the $M_B$ best beams along with the corresponding gain and phase for the $M_B$ best beams and, at 160, transmitting the feedback message to the transmitter.

In some embodiments, the functionality of any of the methods described herein, such as those illustrated in FIG. 5, 9a, or 9b discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Figure 10A:
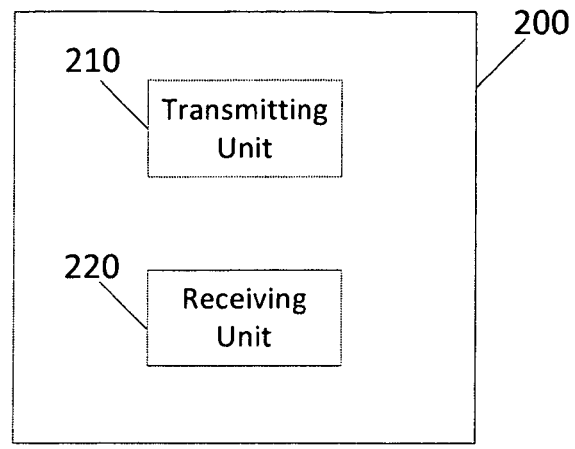
FIG. 10a illustrates a block diagram of an apparatus, according to one embodiment.

FIG. 10a illustrates a block diagram of an apparatus 200 according to another embodiment. In the example embodiment of FIG. 10a, apparatus 200 may include a transmitting unit 210 and a receiving unit 220. In this embodiment, the transmitting unit 200 may be configured for transmitting sounding waveforms from Q orthogonal basis functions from the transmit array of the apparatus 200. According to this embodiment, the receiving unit 220 may be configured for receiving feedback message(s) from a receiver. The feedback message(s) may include, for example, an indication of the best $M_B$ transmit beams plus a gain and phase value for each of the $M_B$ beams.

Figure 10B:
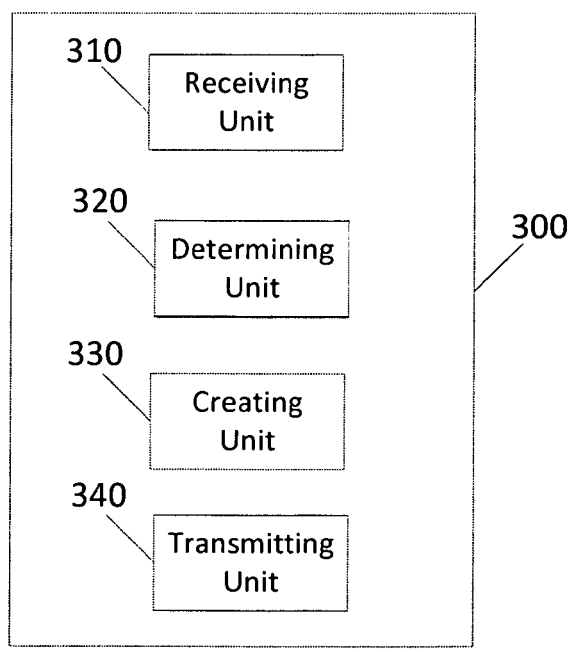
FIG. 10b illustrates a block diagram of an apparatus, according to another embodiment.

FIG. 10b illustrates a block diagram of an apparatus 300 according to another embodiment. In the example embodiment of FIG. 10b, apparatus 300 may include a receiving unit 310, determining unit 320, creating unit 330, and transmitting unit 340. In one embodiment, the receiving unit 310 may be configured for receiving sounding waveforms from a transmitter. In an embodiment, each of the sounding waveforms may include a waveform sent from Q orthogonal basis functions. According to certain embodiments, determining unit 320 may be configured for determining the $M_B$ best transmit beams and determining the gain and phase for each of the $M_B$ beams. In an embodiment, the creating unit 330 may be configured for creating a feedback message that may include an indication of the $M_B$ best beams along with the corresponding gain and phase for the $M_B$ best beams. In one embodiment, the transmitting unit 340 may be configured for transmitting the feedback message to the transmitter.

In view of the above, embodiments enable the full channel knowledge to be available to RF beam steering algorithms as opposed to just a single best beam. Some advantages according to certain embodiments include the obtaining of full channel knowledge with RF beamforming arrays, and greatly improving performance (especially for MU-MIMO). Embodiments require very little sounding time since only orthogonal basis needs to be sounded instead of very fine grid of beams. For example, with an M×M array, the fine grid of beams needs to sound $4M^2$ beams for decent alignment whereas the basis functions only need to scan $M^2$ beams.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of obtaining channel knowledge at a transmitter with Q transmit antennas for use in beamforming, the method comprising:
   transmitting, by a transmitting device, sounding waveforms from B orthogonal basis functions from a transmit array comprised of the Q transmit antennas of the transmitting device; and
   receiving at least one feedback message from a receiver, wherein the at least one feedback message comprises an indication of a plurality of best MB transmit basis functions and a gain and phase value for each of the best MB transmit basis functions.

2. The method according to claim 1, wherein a channel estimate is obtained from the feedback.

3. The method according to claim 1, wherein the feedback message further comprises an indication of a plurality of best NB receive basis functions.

4. The method according to claim 1, wherein the feedback message further comprises the number of best transmit basis functions.

5. An apparatus, comprising:
   at least one processor; and
   at least one memory including computer program code, wherein the at least one memory and the computer program code are configured, with the at least one processor, to cause the apparatus at least to
   transmit sounding waveforms from B orthogonal basis functions from a transmit array comprised of Q transmit antennas of the apparatus; and
   receive at least one feedback message from a receiver, wherein the at least one feedback message comprises an indication of a plurality of best MB transmit basis functions and a gain and phase value for each of the best MB transmit basis functions.

6. The apparatus according to claim 5, wherein a channel estimate is obtained from the feedback.

7. The method according to claim 5, wherein the B orthogonal basis functions are Qx1 orthogonal transmit beams.

8. The apparatus according to claim 5, wherein the B orthogonal basis functions are Qx1 transmit beams derived from a discrete Fourier transform (DFT) matrix.

9. The apparatus according to claim 5, wherein the feedback message further comprises an indication of a plurality of best NB receive basis functions.

10. The apparatus according to claim 5, wherein the feedback message further comprises the number of best transmit basis functions.

11. A method of determining channel feedback, the method comprising:
    receiving, by a receiving device, sounding waveforms from a transmitter, wherein each of the sounding waveforms comprises a waveform sent from B orthogonal basis functions where the orthogonal basis functions comprise Qx1 orthogonal transmit beams;
    determining a plurality of best MB transmit basis functions;
    determining a gain and phase for each of the best MB transmit basis functions;
    creating a feedback message comprising an indication of the best MB transmit basis functions along with the corresponding gain and phase for the best MB transmit basis functions; and
    transmitting the feedback message to the transmitter.

12. The method according to claim 11, further comprising:
    determining, by the receiving device, its best receive beam from the transmit beam sounding waveforms; and
    determining the best transmit basis function feedback for the best receive beam.

13. The method according to claim 12, wherein the determining of the best receive beam comprises:
    choosing a plurality of best NB receive basis functions, a gain and phase for each of the best $N_B$ receive basis functions; and
    determining the best receive beam as a function of the best $N_B$ receive basis functions and their respective gain and phase values.

14. The method according to claim 11, wherein the feedback message further comprises an indication of a plurality of best $N_B$ receive basis functions.

15. The method according to claim 11, further comprising transmitting, by the receiving device, its feedback message using its best beam.

16. An apparatus, comprising:
    at least one processor; and
    at least one memory including computer program code, wherein the at least one memory and the computer program code are configured, with the at least one processor, to cause the apparatus at least to
    receive sounding waveforms from a transmitter, wherein each of the sounding waveforms comprises a waveform sent from Q orthogonal basis functions, wherein the orthogonal basis functions comprise Qx1 orthogonal transmit beams;
    determine a plurality of best $M_B$ transmit basis functions;
    determine a gain and phase for each of the best $M_B$ transmit basis functions;
    create a feedback message comprising an indication of the best $M_B$ transmit basis functions along with the corresponding gain and phase for the best $M_B$ transmit basis functions; and
    transmit the feedback message to the transmitter.

17. The apparatus according to claim 16, wherein the at least one memory and the computer program code are further configured, with the at least one processor, to cause the apparatus at least to:
    determine a best receive beam for the apparatus from the transmit beam sounding waveforms; and
    determine a best transmit basis function feedback for the best receive beam.

18. The apparatus according to claim 17, wherein the determining of the best receive beam comprises:
    choosing a plurality of best $N_B$ receive basis functions, a gain and phase for each of the best $N_B$ receive basis functions; and
    determining the best receive basis function as a function of the best NB receive basis functions and their respective gain and phase values.

19. The apparatus according to claim 16, wherein the feedback message further comprises an indication of a plurality of best $N_B$ receive basis functions.

20. The apparatus according to claim 16, wherein the at least one memory and the computer program code are further configured, with the at least one processor, to cause the apparatus at least to transmit a feedback message using the best beam of the apparatus.

\* \* \* \* \*